United States Patent [19]

Bolus et al.

[11] 4,167,654

[45] Sep. 11, 1979

[54] TELEPHONE LINE FEEDING CIRCUIT INCLUDING A PROTECTIVE DEVICE

[75] Inventors: Daniel M. A. F. Bolus, Jovas Ponchartrain; Jean P. Chevillon, Plaisir; Jean C. Conte, Jouy-en-Josas; Pierre D. P. Philippe, Clamart, all of France

[73] Assignee: International Standard Electric Corporation, New York, N.Y.

[21] Appl. No.: 882,005

[22] Filed: Feb. 28, 1978

[30] Foreign Application Priority Data

Mar. 2, 1977 [FR] France .................. 77 06101

[51] Int. Cl.² ............................. H04M 1/00
[52] U.S. Cl. ..................... 179/81 R; 179/18 FA; 179/77
[58] Field of Search .................. 179/77, 81 R

[56] References Cited

U.S. PATENT DOCUMENTS 3,989,902  11/1976  Cowpland .................. 179/81 R

FOREIGN PATENT DOCUMENTS 2254168  7/1975  France .................. 179/77

Primary Examiner—Thomas A. Robinson
Attorney, Agent, or Firm—John T. O'Halloran; Jeffrey P. Morris

[57] ABSTRACT

A telephone line feed circuit is disclosed including a protective device which is located on the line ahead of the feeding device. The protective device reduces the voltage variations at the terminals of the feeding voltage in the event of overvoltage on the line. This advantageously protects the cross points of the switch against overvoltage.

3 Claims, 5 Drawing Figures

NORMAL MODE | LIMITED MODE

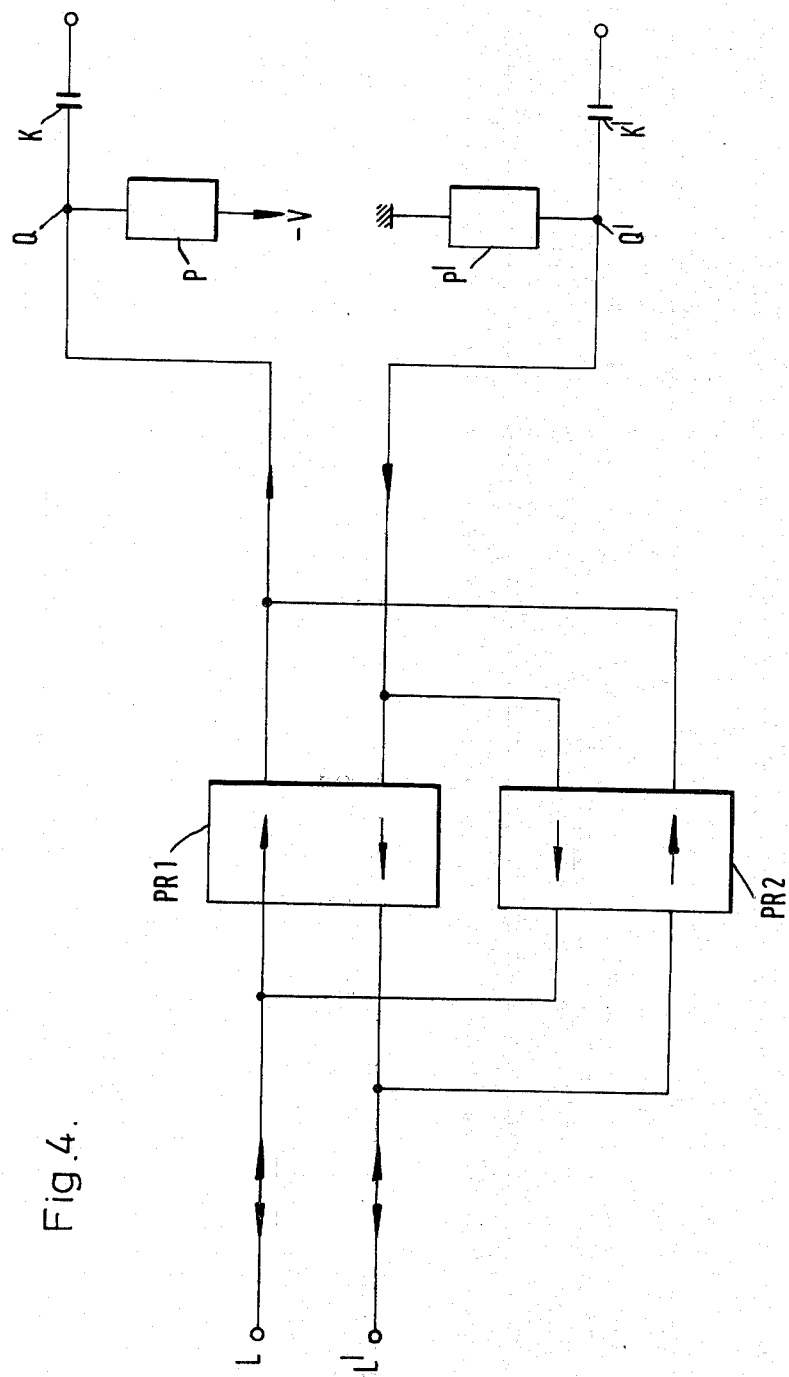

TELEPHONE LINE FEEDING CIRCUIT INCLUDING A PROTECTIVE DEVICE

BACKGROUND OF THE INVENTION

This invention concerns a telephone line feeding circuit equipped with an overvoltage protection device.

Telephone lines are connected to the switching network of their local exchange so that they can be interconnected. They are supplied with direct current by means of feeding circuits placed at the end of the switching network. A blocking capacitor is inserted in each wire of the line so as to prevent the flow of direct current in the crosspoints.

However, a major disadvantage of such an arrangement is that it does not protect the switching network in the case of an a-c overvoltage coming from the line: in fact, almost all of this a-c overvoltage is present at the terminals of the feeding circuit and therefore at the crosspoints of the switching network. The crosspoints risk being destroyed if they are of the semiconductor type, or at least their lifetime will be reduced if they are metallic.

In the case of d-c overvoltage coming from the line, the switching network will be protected by the blocking capacitors, but they would have to be designed to withstand a high voltage making them bulky and more costly.

SUMMARY OF THE INVENTION

An object of this invention is to provide a telephone line feeding circuit overcoming the above mentioned drawbacks.

The feeding circuit according to the invention is characterized more particularly in that it contains a protective device placed in the line ahead of the dc feed voltage source, limiting the voltage swing at the terminals of the said voltage source in case of overvoltage on the line.

Other characteristics and advantages of this invention will be brought out in the following description of embodiments, the said description being related to the attached drawings in which:

BRIEF DESCRIPTION OF THE DRAWINGS

FIG. 4 shows a line feeding circuit containing two protective devices connected in opposite direction.

DESCRIPTION OF THE PREFERRED EMBODIMENTS

Figure 1:
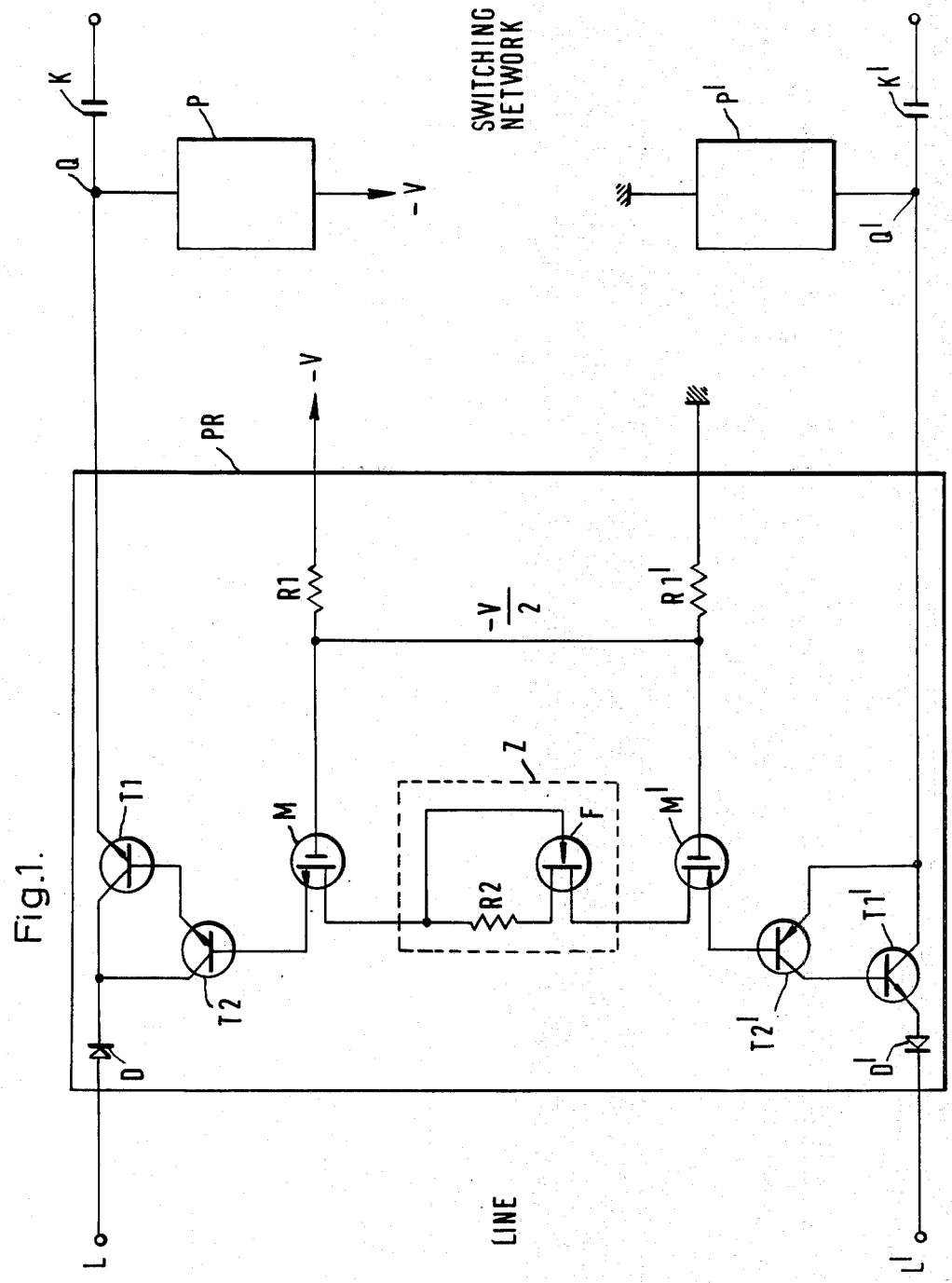
FIG. 1 shows a diagram of the line feeding circuit with protective device according to the invention.

FIG. 1 shows a diagram of the line feeding circuit with protective device according to the invention. It includes two branches P and P' of a dc voltage source placed in series in each branch of the power supply delivering a d-c voltage −V, usually −48 volts. These branches of the dc voltage source are connected respectively to each of the two wires of the telephone line by means of Q and Q'. They present the characteristic of offering a low resistance to direct current and a high impedance to alternating current. Their purpose is to isolate the supply from the a-c point of view in order not to attenuate the speech signals and to prevent crosstalk. These dc voltage sources, which are sometimes called feeding dipoles which can be electronic, are known in telephone engineering and will therefore not be described in further detail. Two blocking capacitors K and K', placed respectively in each wire of the line between the branches of the dc voltage source and the switching network of the exchange, prevent the supply current from flowing in the cross-points. A protective device PR is placed on the line side.

The protective device PR includes two transistors T1 and T2 of the NPN type connected as a "Darlington" circuit. Transistor T1 is placed in series with the line wire receiving the supply voltage −V, and its emitter is connected to point Q of dc feeding voltage branch P. The collector of transistor T2 is connected to the collector of transistor T1. The emitter of transistor T2 is connected to the base of transistor T1. The protective device PR also includes two other transistors T1' and T2' connected as a false "Darlington" circuit. The NPN-type transistor T1' is placed in series with the other line wire and its collector is connected to point Q' of dc feeding voltage branch P'. The collector and the emitter of the PNP-type transistor T2' are connected respectively to the base and collector of transistor T1'.

The base of transistor T2 is connected to a high-impedance circuit Z through an N-channel MOS transistor, designated by the symbol M. The base of transistor T2' is also connected to the said circuit Z through a P-channel MOS transistor, designated by the the symbol M'. The gate potentials of both MOS transistor M and M' are fixed at −V/2, by means of a bridge of two equal resistors R1 and R1' supplied by the voltage −V.

The high impedance circuit Z consists of an N-channel field-effect transistor F having a resistor R2 in series with the input. The gate is biased by the voltage across the terminals of resistor R2.

The operation of the protective device PR will now be explained. Two phases of operation will be noted:

(1) Operation in normal mode;
(2) Operation in limited mode.

These two phases of operation are defined as a function of the voltages $v_L$ and $v_L'$ at the input terminals L and L' of the protective circuit PR.

The normal mode corresponds to the following voltages $v_L$ and $v_L'$:

$$-V < v_L < -V_S$$

and $$-V_S < v_{L'} < 0$$

where $V_S$ is the threshold voltage virtually equal to $V/2$.

This is the case in which there is no overvoltage, or just small overvoltages which are not dangerous.

The limited mode corresponds to the following voltages $v_L$ and $v_L'$:

$$v_L > -V_S$$

or $$v_{L'} < -V_S.$$

This is the case in which a dangerous overvoltage is present.

The two phases of operation will be examined successively.

(1) Operation in Normal Mode

Figure 2A:
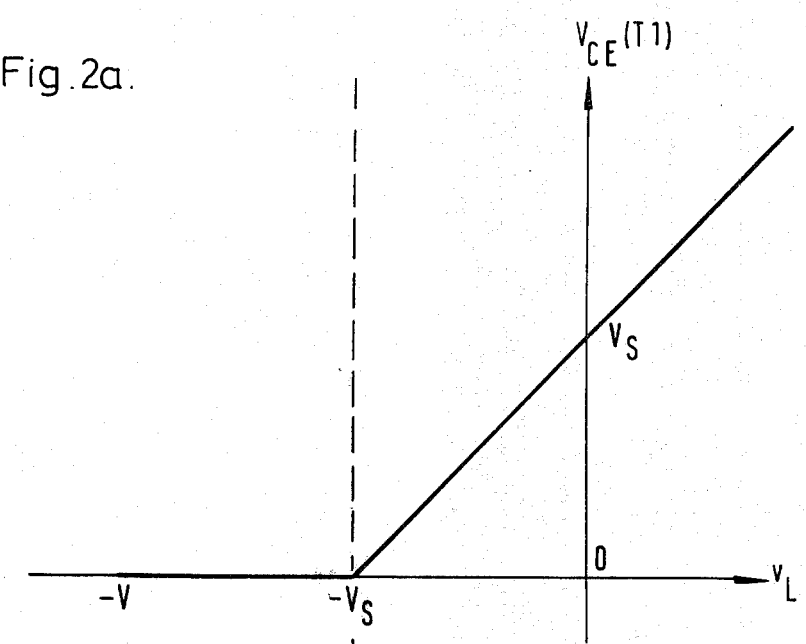
FIGS. 2a and 2b are voltage curves used to explain the operation of the device in accordance with the principles of the invention.
Figure 2B:
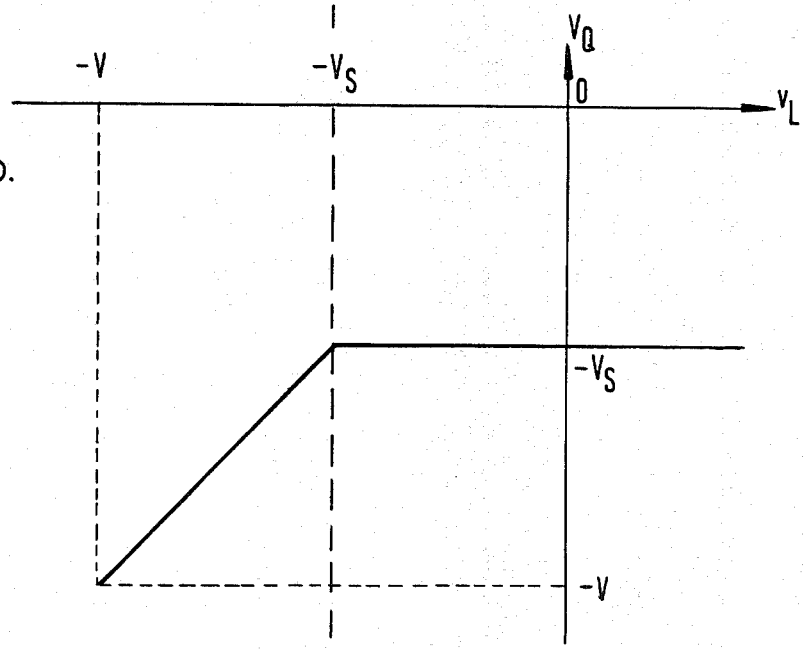

In normal mode, transistors T1 and T1' operate in the rising part of their characteristic curve $I_c = f(V_{CE})$ with $I_B$ cst, and present a very low impedance (on the order of 5Ω). Circuit Z operates as a current generator and therefore presents a high impedance. The transmission characteristics of the speech signals are therefore not attenuated by the protective device PR, and all the voltage variations are found at terminals Q and Q' of the dc feeding voltage branches. The MOS transistors M and M' operate in the rising part of their characteristic curve $I_D = f(V_{DS})$ with $V_{GS}$ cst, and deliver a constant drain current while the gate-source voltage follows the voltage variations at terminals Q and Q'. This situation corresponds to the "normal mode" part of FIGS. 2a and 2b, located to the left of the dotted vertical line. FIG. 2a represents the voltage $V_{CE}$ of transistor T1 as a function of the voltage $v_L$ at the input terminal L. FIG. 2$^b$ represents the voltage $v_Q$ at terminal Q of dc feeding voltage source branch P as a function of the voltage $v_L$.

(2) Operation in Limited Mode

The operation in limited mode will be examined, considering the voltage $v_L$ at the input terminal L. When voltage $v_L$ reaches the value $-V_S$, the gate-source voltage of the MOS transistor M approaches zero and the drain current diminishes, thus reducing the base current of transistor T2. Consequently, transistor T1 operates on the horizontal part of its characteristic curve $I_c = f(V_{CE})$ with $I_B$ cst, and its voltage $V_{CE}$ increases in the same way as $v_L$. Transistors T1, T2 and M operate as a voltage regulator, regulating the voltage $v_Q$ to the value $-V_S$. This situation corresponds to the "limited mode" part of FIGS. 2a and 2b, located to the right of the dotted vertical line.

When voltage $v_L$ is less than $-V$, transistor T1 is cut off. A diode D protects it. Similarly, when voltage $v_L$, is greater than zero, transistor T1' is cut off. It also protected by a diode D'.

Thus whatever the values of the voltages at terminals L and L' of the protective device PR are, we will always have:

$$-V < v_Q < -V_S$$

and $$-V_S < vQ < 0$$

This limitation of the voltage swing at the terminals of dc feeding voltage source branches P and P' thus effectively protects the switching network against line overvoltages. It also presents the advantage of limiting the current flowing through the two dc voltage source branches.

The circuit described above uses transistors mounted in a "Darlington" configuration in order to increase current gain and thus to operate with a low control current in the MOS transistors M and M' and in the circuit Z. In principle, the circuit could just as well be designed with a single transistor in each wire.

The protective device PR can be designed to withstand overvoltages during the entire duration of their presence. However, this would require much larger and more costly transistors T1 and T1'. Another solution consists in cutting these transistors off a short time after the appearance of an overvoltage. The overvoltage is detected by a detection circuit (not shown) placed ahead of the protective device PR. This circuit can be of the type described in the French Patent Application No. 77 00542 filed on Jan. 11, 1977 by the applicant.

Figure 3:
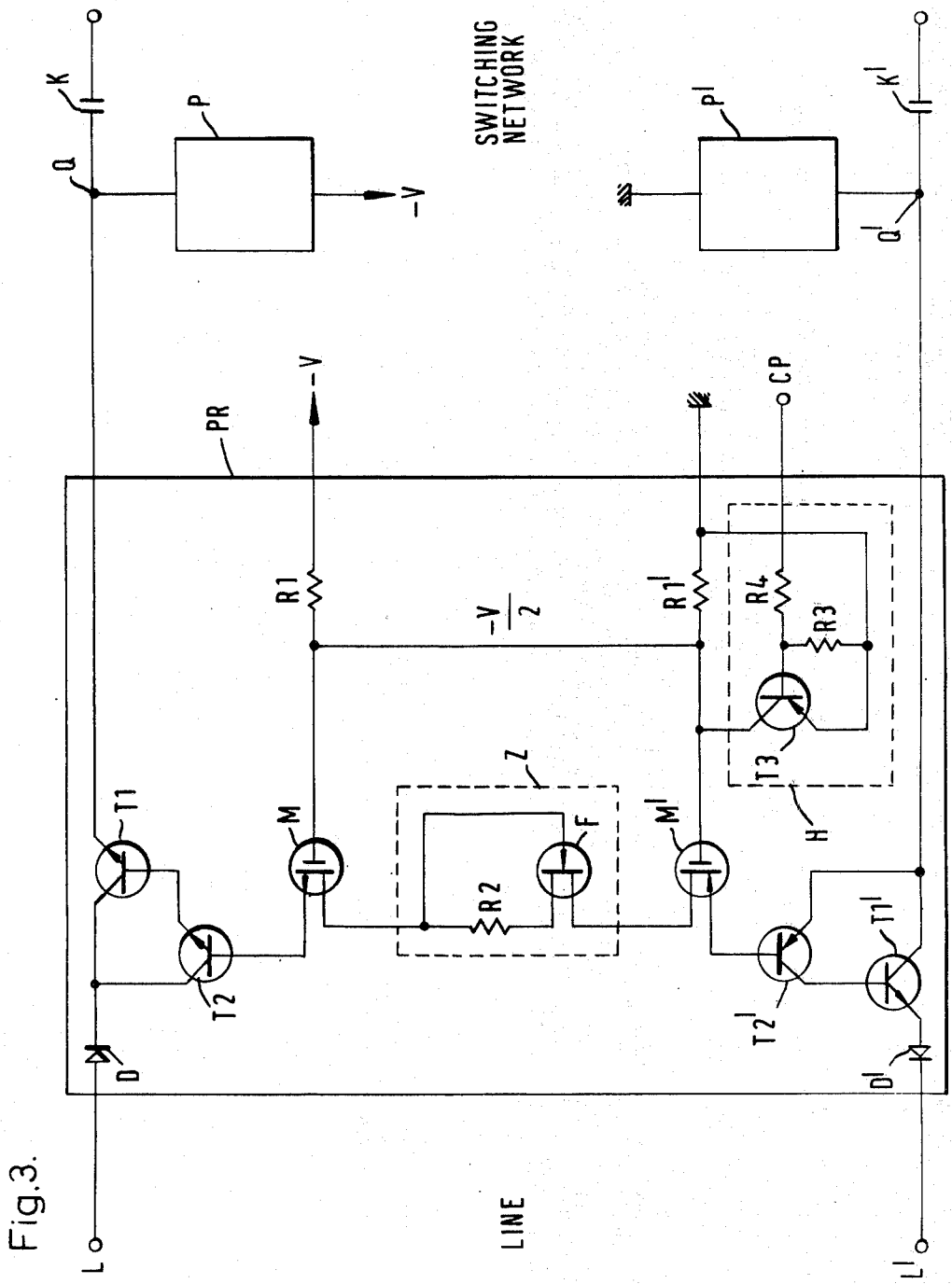
FIG. 3 shows a variant of the line feeding circuit in FIG. 1.

Transistors T1 and T1' can be cut off by means of a cut-off circuit H shown in FIG. 3. It includes a PNP-type transistor T3 whose collector is connected to the gate of the MOS transistor M' and whose emitter is connected to ground. The base receives a cut-off signal CP by means of two resistors R3 and R4. Thus, when this signal goes negative, transistor T3 conducts, grounding the gate of the MOS transistor M' which is then cut off, having the effect of cutting off the "Darlington" transistors. The line is no longer supplied.

Cut-off of the line supply at the level of the protective device presents, in addition to complete protection of the switching network, the advantage of being able to reverse the battery without the need for bidirectional feeding voltage sources. This advantage is realized by means of the line feeding circuit shown in FIG. 4. Again, we find the two capacitors K and K' as well as the two voltage source branches P and P'. Two protective devices PR1 and PR2, identical to the protection device PR in FIG. 3, are placed ahead of the voltage source branches so that they conduct current in opposite directions. The protective circuit PR1 connects the input terminal L to terminal Q of feeding voltage branch P and the input terminal L' to terminal Q' of feeding voltage branch P'. The protective circuit PR2 connects terminal L to terminal Q' and terminal L' to terminal Q. Thus, by switching the protective circuits, the direction of the supply current in the line is reversed, while it is always the same in the branches of the dc voltage source.

Although this invention has been described in connection with particular embodiments, it is clearly not limited to the said embodiments and is capable of variants or modifications still lying within its scope.

We claim:

1. A telephone line feeding circuit comprising: a d-c voltage source $(-V)$ including means for feeding said dc voltage to the two wires of said telephone line, including two branches of said dc voltage source;

protective device means for maintaining the voltages $v_Q$ and $v_{Q'}$ at terminals of said dc voltage feeding means within a limited range such that:

$$-V < v_Q < -V_S$$

$$-V_S < vQ < 0$$

where $V_S$ is a threshold voltage having a value approximately equal to V/2, said protective device means including:

two transistors coupled ahead of said dc voltage feeding means, in series with each of the two wires of said line respectively;

a high-impedance circuit connected by two MOS transistors to the bases of the two transistors, with the gates of the said MOS transistors having a fixed voltage $-V/2$;

two protective diodes placed respectively in series with the two transistors.

2. A circuit according to claim 1, wherein said protective device further includes:

a cut-off circuit to cut off one of said MOS transistors by changing the gate voltage applied thereto.

3. A circuit according to claim 2, further including:

a further protective device means, configured with opposite polarity to the other protective device means such that the polarities of the d-c line voltage are reversed by switching said protective circuit device means; and means for switching said protective device means.

* * * * *